(12) United States Patent
Gaud et al.

(10) Patent No.: US 6,256,864 B1
(45) Date of Patent: Jul. 10, 2001

(54) PROCESS FOR PRODUCING AN ASSEMBLY HAVING SEVERAL MAGNETIC HEADS AND MULTIPLE HEAD ASSEMBLY OBTAINED BY THIS PROCESS

(75) Inventors: Pierre Gaud, Coublevie; Jean-Baptiste Albertini, Grenoble; Henri Sibuet, Le Fontanil, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/235,311

(22) Filed: Jan. 22, 1999

(30) Foreign Application Priority Data

Feb. 11, 1998 (FR) .................................................. 98 01617

(51) Int. Cl.$^7$ .......................... G11B 5/127; H04R 31/00
(52) U.S. Cl. ..................................... 29/603.13; 29/603.01;
29/603.07; 29/603.13; 29/603.14; 29/603.15;
360/121; 360/124
(58) Field of Search ........................... 29/603.07, 603.13,
29/603.14, 603.15, 603.01; 360/121, 124

(56) References Cited

U.S. PATENT DOCUMENTS

| | | | | |
|---|---|---|---|---|
| 3,662,119 | * | 5/1972 | Romankiw | 179/100.2 C |
| 3,710,438 | * | 1/1973 | Max | 29/603 |
| 4,399,479 | * | 8/1983 | Meckel | 360/126 |
| 4,477,853 | * | 10/1984 | Lemke | 360/125 |
| 4,550,492 | * | 11/1985 | Lemke | 29/603 |
| 4,670,972 | * | 6/1987 | Sakakima | 29/603 |
| 4,769,898 | * | 9/1988 | Ono | 29/603 |
| 4,837,924 | * | 6/1989 | Lazzari | 29/603 |
| 4,855,854 | * | 8/1989 | Wada | 360/126 |
| 5,067,230 | * | 11/1991 | Meunier | 29/603 |
| 5,090,111 | * | 2/1992 | Lazzari | 29/603 |
| 5,093,980 | * | 3/1992 | Maurice | 29/603 |
| 5,113,575 | * | 5/1992 | Fedeli | 29/603 |
| 5,167,062 | * | 12/1992 | Castera | 29/603 |
| 5,566,442 | * | 10/1996 | Gaud | 29/603.14 |
| 5,604,973 | * | 2/1997 | Gaud | 29/603.15 |
| 5,781,986 | * | 7/1998 | Maurice | 29/603.14 |
| 5,784,772 | * | 7/1998 | Ewasko | 29/603.15 |
| 5,842,269 | | 12/1998 | Albertini et al. | |
| 5,890,278 | * | 4/1999 | Van Kesteren | 29/603.14 |
| 6,105,238 | * | 8/2000 | Chesnutt | 29/603.14 |

FOREIGN PATENT DOCUMENTS

| | | |
|---|---|---|
| 2 747 226 | 10/1997 | (FR) . |
| 2 299 441 | 10/1996 | (GB) . |

OTHER PUBLICATIONS

Patent Abstracts of Japan, vol. 018, No. 172 (P–1715), Mar. 23, 1994, JP 05 334627, Dec. 17, 1993.
Patent Abstracts of Japan, vol. 018, No. 685 (P–1848), Dec. 22, 1994, JP 06 267024, Sep. 22, 1994.

* cited by examiner

Primary Examiner—Gregory L. Huson
Assistant Examiner—Paul Kim
(74) Attorney, Agent, or Firm—Oblon, Spivak, McClelland, Maier & Neustadt, P.C.

(57) ABSTRACT

Process for the production of an assembly having several magnetic heads and multiple head assembly obtained by said process.

Production takes place of a first substrate (60) with first pole pieces (62$_1$, 62$_2$) and a second substrate (70) with second pole pieces (72$_1$, 73$_3$) and magnetic connectors (74$_1$, 74$_2$). One of the substrates is reversed and engaged on the other. The second substrate is thinned out so that the two pole pieces (72$_1$, 72$_2$) and the magnetic connectors (74$_1$, 74$_2$) are level or almost level. The assembly is completed by forming on the second thinned out substrate, magnetic circuit closing means and conductor coils.

Application to the production of multiple magnetic head assemblies.

26 Claims, 10 Drawing Sheets

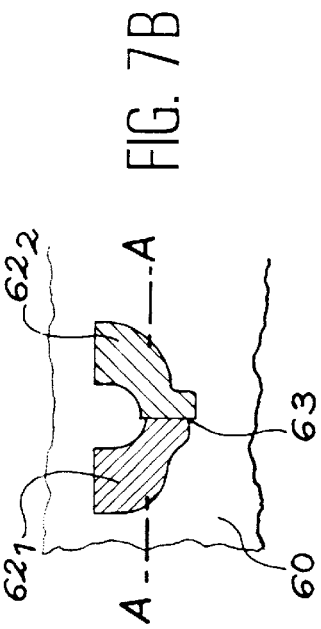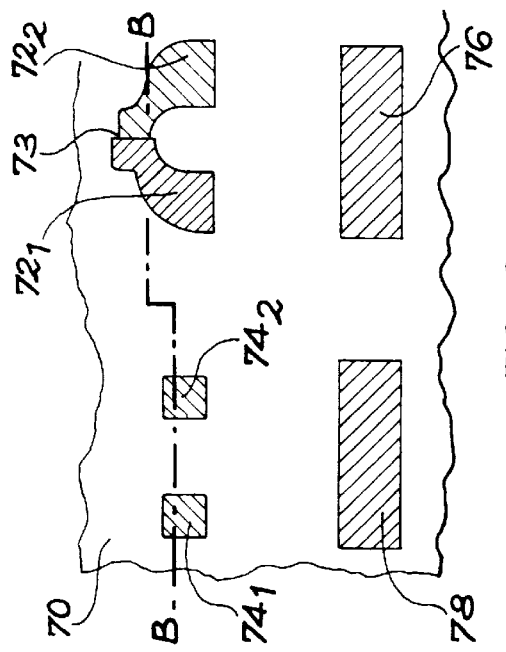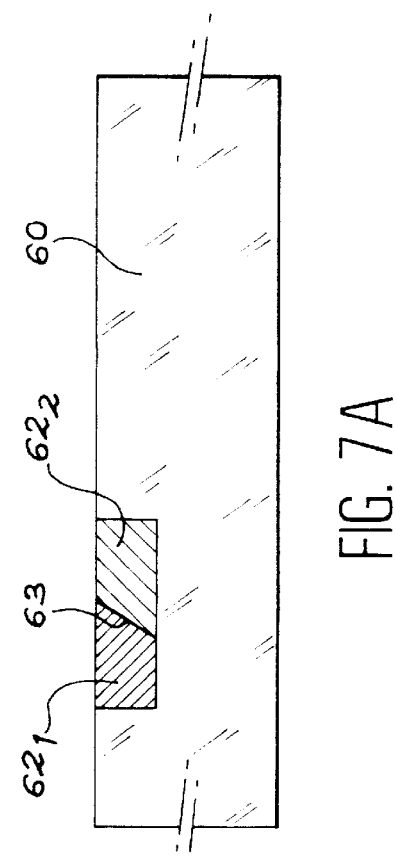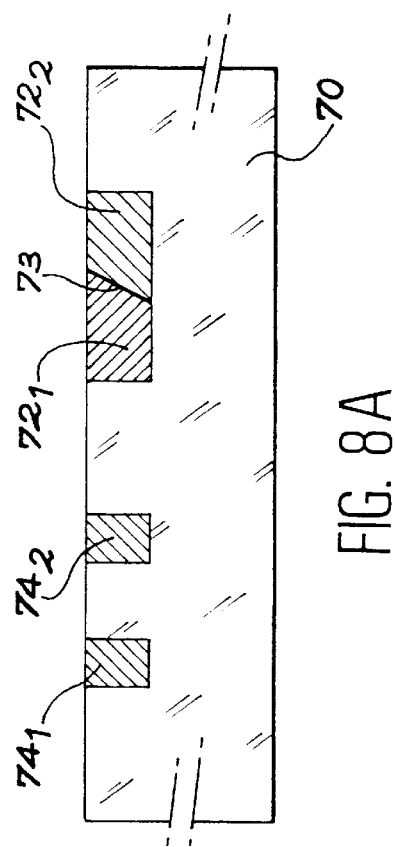

PROCESS FOR PRODUCING AN ASSEMBLY HAVING SEVERAL MAGNETIC HEADS AND MULTIPLE HEAD ASSEMBLY OBTAINED BY THIS PROCESS

DESCRIPTION

1. TECHNICAL FIELD

The present invention relates to a process for producing an assembly having several magnetic heads and to a multiple head assembly obtained by this process.

A particularly preferred application occurs in general public video recording, but use is also possible in other fields, such as data backup or computer memories.

2. PRIOR ART

A magnetic recording support for video recording, data backup or computer memories comprises several tracks on which informations are written in the form of magnetic domains.

In order to increase the information density, there is a rise not only in the number of informations per length unit, but also the number of tracks. For this purpose the track width is reduced and simultaneously there is a reduction of the gap separating them until the tracks are contiguous.

In order to avoid any crosstalk problem on reading, the informations are written on two adjacent tracks in inclined manner with opposing inclination angles. These inclination angles are known as azimuth angles. The magnetic head gap must have an azimuth, whose value corresponds to the inclination of the recording.

Thus, the attached FIG. 1 shows a recording support with two tracks 10a and 10b, whose writing directions, fixed by the gap and shown in oblique line form, form angles +i for track 10a and −i for track 10b with the normal to the general direction of the tracks.

The attached FIG. 2 shows two magnetic heads 12a, 12b with gaps 14a, 14b having azimuth angles of respectively +i and −i. The head displacement direction is designated D.

In reality, an assembly of two heads azimuthed in opposite directions is not generally in the form of two juxtaposed heads as in FIG. 2, otherwise the tracks read would not be contiguous. It is in the form of two mutually longitudinally displaced or offset heads, as illustrated in FIG. 3. This arrangement makes it possible to narrow the tracks. In this arrangement, each of the two heads 16a, 16b has an azimuthed gap of total width L, the two gaps being separated by a distance T. Each head can then browse a recording track of width e, said tracks being quasi-contiguous. The overlap of the heads is designated r.

In order to have contiguous tracks written with opposed azimuths and of the same width, it is necessary for the recording period P, i.e. the distance between two tracks recorded with the same azimuth, to be linked to L, r and e by the relation:

$$P=2(L-r)=2e \text{ or } r=L-P/2=L-e.$$

For example, we obtain for P=10 $\mu$m e=5 $\mu$m for L=6 $\mu$m and r=1 $\mu$m, it obviously being possible to choose L=e and r=0.

In the case of heads having different pole widths, respectively L1 and L2, the recording period is equal to: P=L1+L2−r−r', in which L1 is the pole width of head 1, L2 the pole width of head 2 and r' the overlap due to the system parameters.

By acting on r and r', it is possible to find two written tracks of the same width, even if the heads have different pole widths. The fact of having heads with different pole widths can be of interest for several reasons, i.e. as a parameter for adjusting the reluctances of the two heads (to have comparable efficiencies), or for tightening a tolerance on one of the two heads.

The two magnetic heads 16a, 16b also comprise not shown means, such as a magnetic flux closure circuit, which connects one pole piece to the other and a conductor coil magnetically coupled to the magnetic circuit. The assembly of all these means forms a double head with opposed azimuths carrying the general reference 18 in FIG. 3. Its displacement direction is symbolized by the arrow D.

In order to obtain such a double head, production generally takes place of two independent heads having gaps inclined in opposite directions and said two heads are installed on a single support. An azimuth magnetic head is shown in exemplified manner in FIG. 4 (in section). It is possible to see a monocrystalline substrate 20, two pole pieces $22_1$, $22_2$ separated by an amagnetic gap 24, which is inclined by an angle i. This inclination is e.g. obtained by taking advantage of the monocrystalline nature of the substrate and by performing anisotropic etching in accordance with a crystallographic plane of the substrate. This process is described in FR-A-2 664 729 (or WO-92/02015).

This double head production process, consisting of regrouping two single heads, is not entirely satisfactory. Thus, it is difficult to correctly orient the two heads so that their gaps have in each case the desired azimuths and it is also difficult to correctly place the two heads with respect to one another, so that each of them cooperates correctly with the tracks. The dimensions given in connection with FIG. 3, more particularly the width of 6.7 microns, show that it is a question of extremely fine settings or adjustments.

FR-A-2 747 226 describes another process for producing an assembly having two magnetic heads with opposing azimuths. One of the variants of this process is illustrated in FIGS. 5 and 6.

FIG. 5 shows a header A with a first head, carrying the general reference 100, with an assembly 102 comprising a magnetic circuit with an azimuthed gap and a conductor coil and two contact pieces $104_1$, $104_2$. Alongside said head is provided a first etched groove 120.

On a counterheader B is provided the same means, namely a second head 130, with an assembly 132 comprising a magnetic circuit with an azimuthed gap identical to the gap of the first head 102, a conductor coil and contact pieces $134_1$, $134_2$. Alongside said second head 130 is provided a second groove 140.

On reversing the counterheader B on the header A, the first head 100 is fitted into the second groove 140 and the second head 132 in the first groove 120 and then the assembly obtained is joined together. The result is diagrammatically illustrated in FIG. 6, where it is possible to see the first head 102 with its azimuthed gap g1, placed on a substrate 150 and covered by an insulating layer 160 and a second head 142 with its gap g2 azimuthed in an opposite direction, with its reversed substrate 150 and its insulating layer 160. The two pieces are inserted in one another. As they are complimentary to one another, they form a one-piece head.

Although satisfactory in many respects, this process still suffers from certain disadvantages. Thus, it would appear more appropriate for an assembly by headers than for an entirely collective process. Thus, it is difficult on a complete plate to control etchings of a few dozen microns (for the fitting of one head in the other) on an already very complex stack and with a tolerance below 1 micron. Moreover, the electrical connection between the two heads is difficult. The junction of the two heads in the vertical portion may not be perfect, which makes dirtying possible. Finally, the cost of a double head of this type compared with a single head is at least multiplied by 4.

The object of the present invention is to obviate these disadvantages. The invention also aims at obtaining not only double heads, but more generally multiple heads.

DESCRIPTION OF THE INVENTION

To this end, the invention proposes a process, where operation once again takes place by reversing one piece on another, but where the coils or windings are produced after reversal and not before, which eliminates the contact renewal problem. There is also an avoidance of deep etching of grooves in the substrates, which simplifies the technology and eliminates the vertical portion of the assembly, where the adhesive joint caused problems. Finally, by using a common technology for both subassemblies, production costs are greatly reduced.

These objectives are achieved by the invention in the following way:

- on a first substrate is formed at least one first subassembly, in each case comprising at least two first pole pieces separated by a first gap,
- on a second substrate is formed at least one second subassembly, comprising in each case at least two second pole pieces separated by a second gap and at least two magnetic connectors made from a magnetic material, said connectors being placed alongside two of said second pole pieces,
- one of the substrates is reversed and engaged on the other in such a way that the two magnetic connectors of the second substrate come or almost come into contact with the two first pole pieces of the first substrate so as to ensure a magnetic continuity,
- the second substrate is thinned out until said second pole pieces and said magnetic connectors appear or almost appear,
- on said second substrate thinned out in this way is formed a first magnetic circuit connecting the two magnetic connectors and a first reading and/or writing means magnetically coupled to said first circuit, as well as a second magnetic circuit connecting the two second pole pieces and a second reading and/or writing means magnetically coupled to the second magnetic circuit.

The magnetic elements of the first and second substrates are not necessarily in direct contact. There can be an insulating layer between these elements, but it must be sufficiently thin (e.g. less than 1 µm) to ensure magnetic continuity. This insulating layer can be useful in certain applications because it permits a magnetic decoupling between the different elements and a reduction of effects due to eddy currents.

In the same way, on thinning out the second substrate, a thin insulating layer can remain above the second pole pieces and magnetic connectors. This insulating layer can be retained during the remainder of the process when the aim is to reduce the effects due to eddy currents. If this layer is electrically insulating, it is obviously etched at the locations of the electric connections and if it is not electrically insulating, i.e. it is conductive, it must be etched in the vicinity of the coil in order to prevent short-circuits.

As an example in connection with the production of said assembly, it is possible to use a substrate of the SOI (silicon-on-insulator) type, which may or may not be completed by epitaxy, the thinning out then taking place down to the buried insulating layer, the magnetic elements being produced in the thin semiconductor film, e.g. of silicon.

According to an embodiment, the writing means is constituted by a conductor coil. According to a first variant, the reading means is also a conductor coil. According to a second variant, the reading means is a magnetoresistance. This magnetoresistance is produced in such a way as to be either to the rear of the pole pieces, or in the magnetic circuit, i.e. in the rear magnetic piece or in the magnetic leads of the circuit. Obviously, electrical connections ensure the supply of the magnetoresistance.

In order to form the first and second magnetic circuits, as well as the first and second conductor coils when the latter exist, useful information is provided by the aforementioned FR-A-2 747 226, according to which there is a successive formation of lower conductor layers, magnetic circuit closing pieces and upper conductor layers spanning said magnetic pieces, the upper layers being connected to the lower layers by a random means, e.g. using conductive connecting elements.

If only a single subassembly is formed on each of the substrates, an assembly having two magnetic heads will be obtained. If two subassemblies are formed on each substrate, an assembly with four heads will be obtained, etc. In general terms, it is possible to use a random number n of substrates, each comprising a random number p of subassemblies, in order to obtain an assembly with np heads.

The present invention also relates to a multiple head assembly obtained by this process.

BRIEF DESCRIPTION OF THE DRAWINGS

FIGS. 7A and 7B show in cross-section and plan view, a first subassembly according to a variant of the invention.

FIGS. 8A and 8B show, in cross-section and in plan view, a second subassembly according to the invention.

DETAILED DESCRIPTION OF EMBODIMENTS

Figure 1:
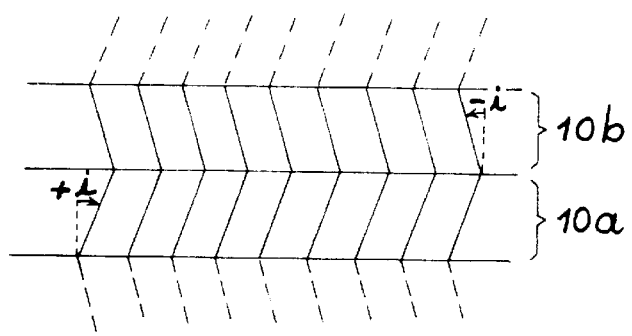
FIG. 1, already described, shows two adjacent recording tracks.
Figure 2:
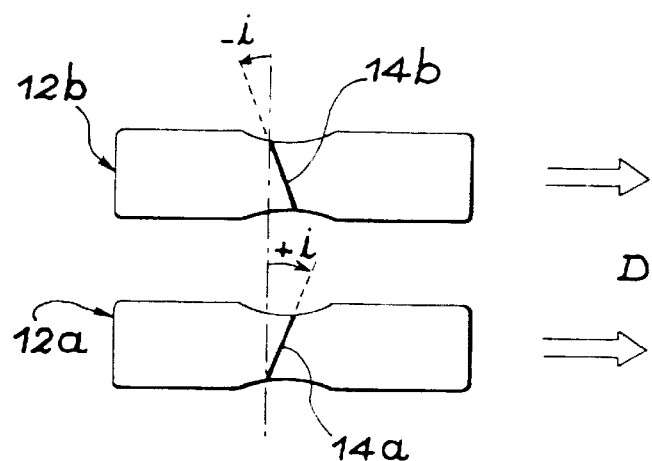
FIG. 2, already described, shows two heads with opposing azimuths.

FIG. 7A shows in cross-section and FIG. 7B in plan view, a first substrate 60, e.g. of silicon, and two first pole pieces $62_1$, $62_2$ separated by a gap 63, which is assumed to have an azimuth. The cross-section of FIG. 7A corresponds to the broken line AA in FIG. 7B.

FIG. 8A also shows in cross-section and FIG. 8B in plan view, a second substrate 70, e.g. of silicon, with second pole pieces $72_1$, $72_2$ separated by a second, azimuthed gap 73 with two magnetic connectors $74_1$, $74_2$ made from a magnetic material and placed alongside the pole pieces $72_1$, $72_2$ and two rear magnetic pieces 76 and 78. The cross-section of FIG. 8A corresponds to the broken line BB in FIG. 8B, which passes through the connectors $74_1$, $74_2$.

One of the two substrates, e.g. the second is reversed. This reversal can take place in the front-back or right-left direction. Once reversal has taken place, the two substrates are engaged or placed on one another. They are mutually positioned, e.g. ensuring the carrying out beforehand of double face lithography so as to align the rear faces, or this is performed directly by infrared sighting. The two thus aligned substrates are assembled, e.g. by an adhesive, anodic bonding or molecular bonding.

The following operation consists of reducing the thickness or thinning out the second substrate 70 from the rear until the second pole pieces $72_1$, $72_2$, the magnetic connectors $74_1$, $74_2$ and the rear magnetic pieces 76, 78 appear. This thinning out can take place by grinding, polishing or implantation, followed by cleaving, etc. As indicated hereinbefore, it is also possible to leave a thin insulating layer.

Figure 9A:
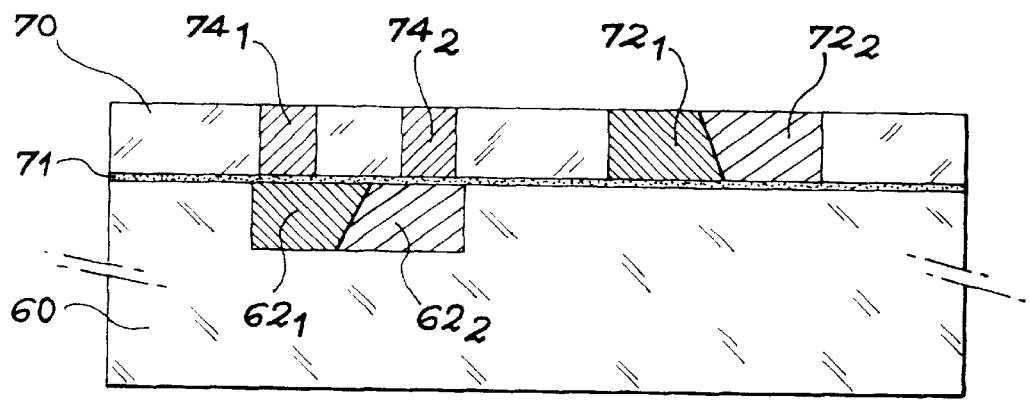
FIGS. 9A and 9B show, in cross-section and in plan view, an assembly having two heads prior to the production of conductor coils and before closing the magnetic circuit.
Figure 9B:
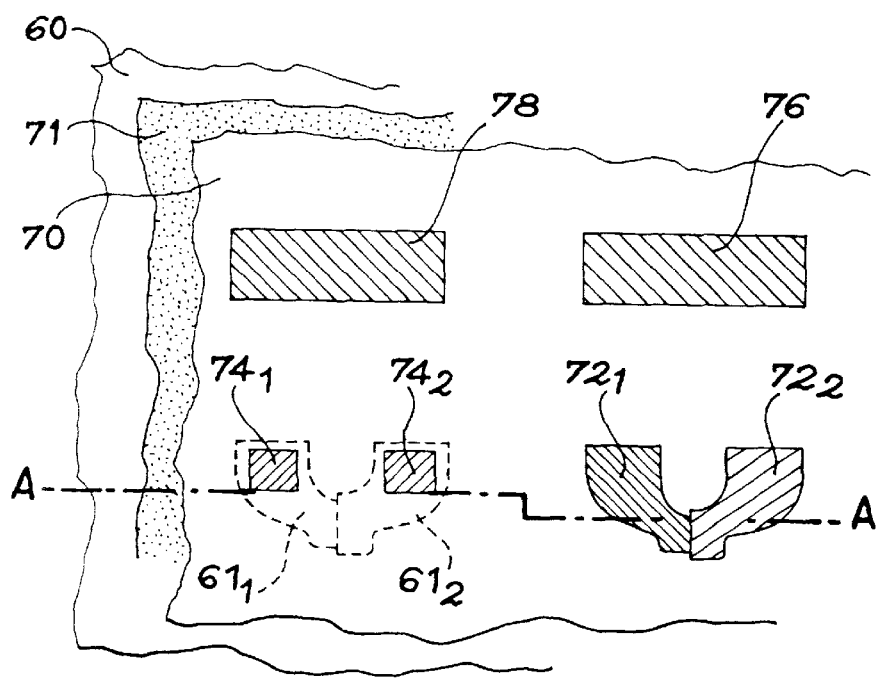

This leads to the assembly illustrated in FIGS. 9A (in cross-section) and 9B (in plan view). The section corresponds to a line AA passing through the contact elements and the second pole pieces. These drawings show that the magnetic connectors $74_1$, $74_2$ must be placed on the second substrate 70 in such a way that they come into contact with the first pole pieces $62_1$, $62_2$ of the first subassembly, when the two substrates are engaged on one another.

FIG. 9A also shows an optional, insulating layer 71 separating the two substrates in order to reduce eddy currents, the magnetic contacts of the different magnetic elements then taking place through the layer 71.

It is then necessary to complete the two magnetic circuits and produce the conductor coils. These operations take place on the assembly formed following the engagement on one another of the two substrates and not, as in the prior art, before such an engagement has taken place.

Figure 10:
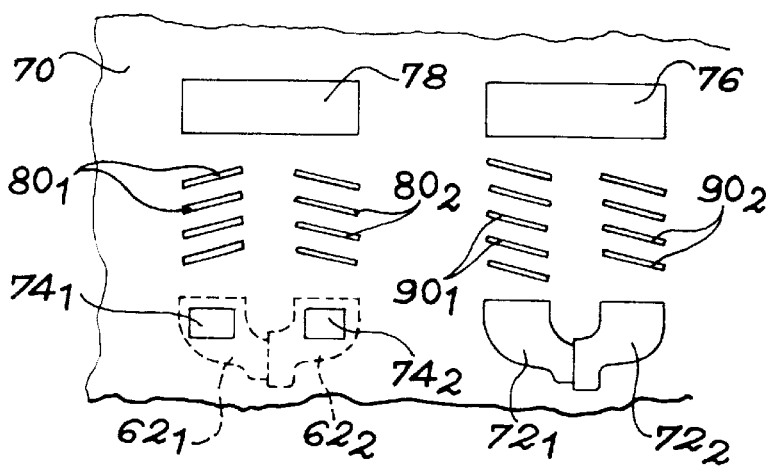
FIGS. 10A, 10B and 10C illustrate, in plan view, three stages in the production of conductor coils and the closing of the magnetic circuits.
Figure 10:
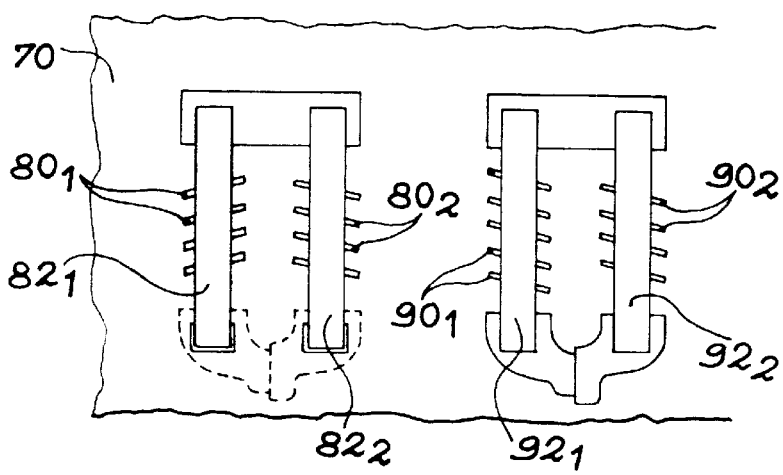
Figure 10:
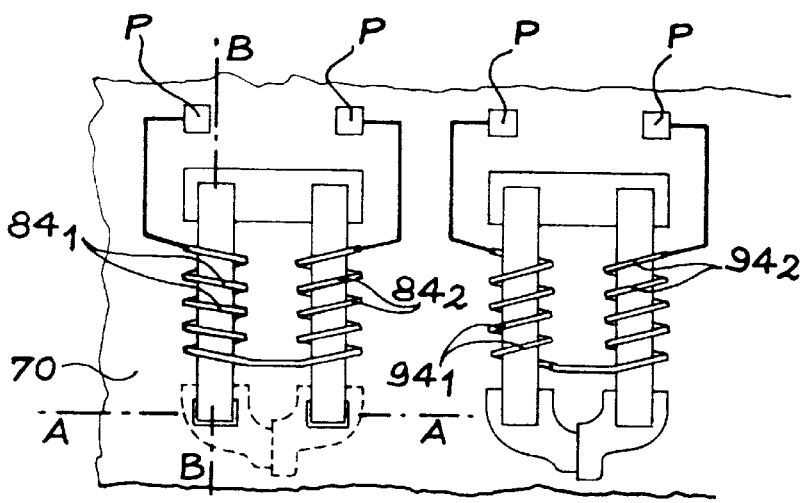

Although various solutions are possible for these operations, FIGS. 10A, 10B and 10C illustrate one of them:

According to FIG. 10A, the first phase is to form on or in the second, thinned out substrate 70 two first, lower conductor layers $80_1$, $80_2$ to the rear of the connectors $74_1$, $74_2$ and two second lower conductor layers $90_1$, $90_2$ to the rear of the second pole pieces $72_1$, $72_2$.

According to FIG. 10B, this is followed by the formation on the second substrate 70 of first, magnetic closing legs $82_1$, $82_2$ connecting one of the magnetic connectors $74_1$ to the other $74_2$ via the rear magnetic piece 78, said legs overlapping the first, lower conductor layers $80_1$, $80_2$. Formation then takes place of two second, magnetic closing legs $92_1$, $92_2$ connecting one of the second pole pieces 721, to the other 722, via the rear magnetic piece 76. These second legs overlap the second, lower conductor layers $90_1$, $90_2$.

According to FIG. 10C, this is followed by the formation of the contact pieces P and the two first, upper conductor layers $84_1$, $84_2$ above the first, lower conductor layers $80_1$, $80_2$ and a second, upper conductor. layer $94_1$, $94_2$ above second lower, conductor layers. The first, lower layers $80_1$, $80_2$ and upper layers $90_1$, $90_2$ are electrically interconnected and form a first coil, whilst the second, lower layers $90_1$, $90_2$ and the second upper layers $94_1$, $94_2$ are electrically interconnected and form a second coil.

In order to carry out electrical connections between conductors of different layers, it is possible to form electrical connectors at the ends of the conductors of the lower layers in such a way that the conductors of the upper layers come into contact therewith. These electrical connectors can be formed prior to the formation of the magnetic legs $82_1$, $82_2$, $92_1$, $92_2$ or afterwards.

Figure 11A:
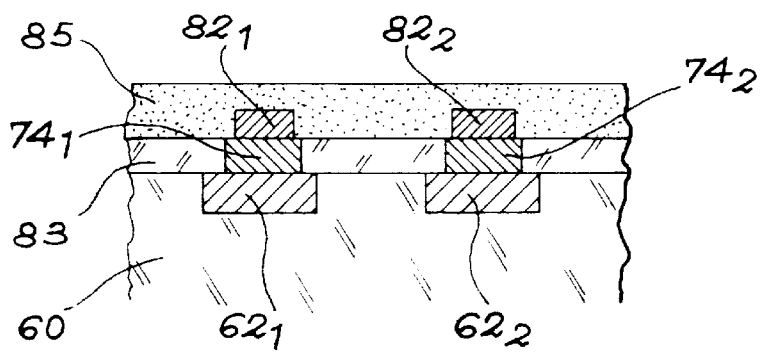
FIGS. 11A and 11B are sections at the magnetic connectors.
Figure 11B:
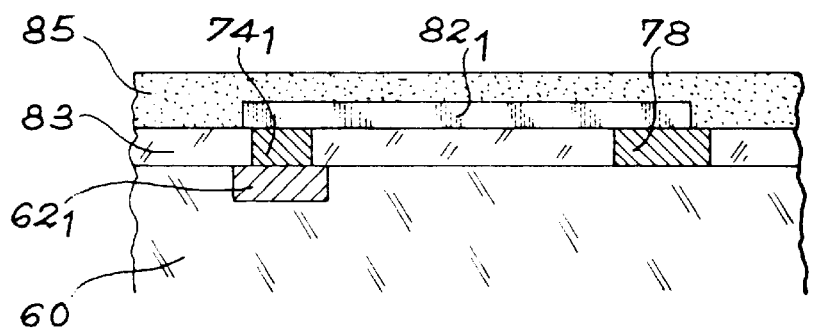
Figure 12:
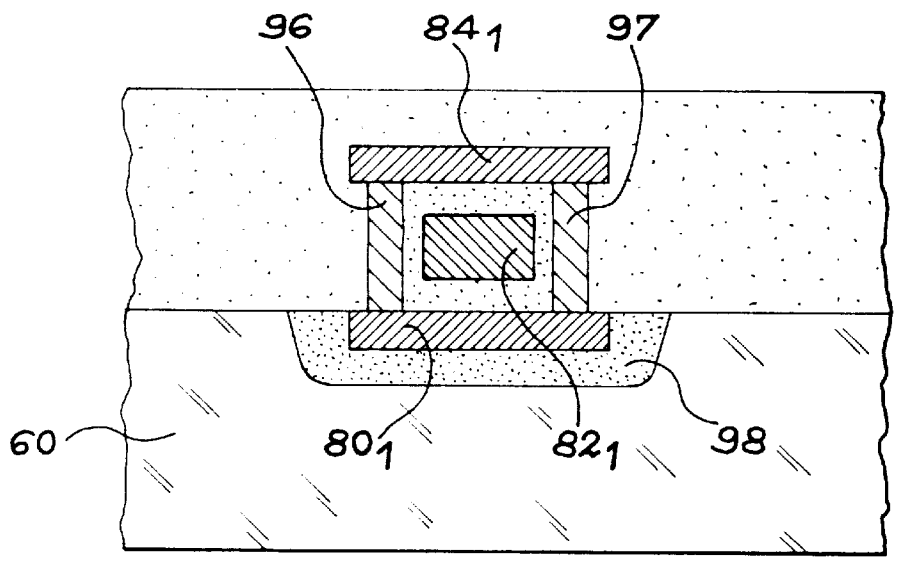
FIG. 12 is a section at the electrical connectors.

FIGS. 11 and 12 illustrate in cross-section the magnetic and electrical connections. FIG. 11 shows in section the pieces at the magnetic connectors $74_1$, $74_2$, which connect the pole pieces $62_1$, $62_2$ to the magnetic legs $82_1$, $82_2$. Insulating layers 83 and 85, e.g. of $SiO_2$, insulate said parts. A supplementary lower optionally covers the assembly and serves as a protective layer.

FIG. 12 shows the pieces or parts in section with conductive connecting elements 96, 97, which connect the conductors of the lower layer $80_1$ and the conductors of the upper layer $84_1$. In the illustrated variant, the lower conductor layer $80_1$ is not simply deposited on the first substrate 60, but is instead buried therein. For this purpose recesses have been etched in the substrate and have been filled with insulant 98 and grooves are formed, which are filled with conductive material.

Figure 13A:
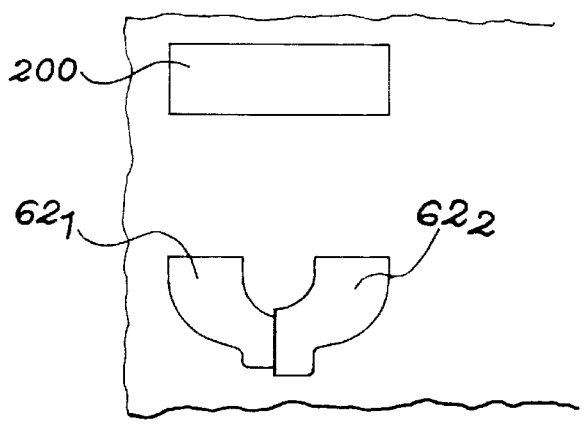
FIGS. 13A and 13B illustrate, in plan view, a variant of a first and a second subassemblies having four magnetic connectors.
Figure 13B:
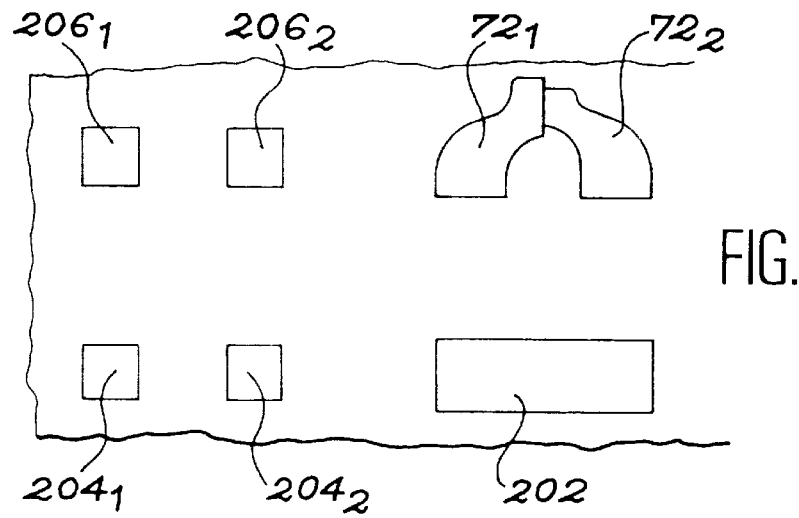

FIGS. 13A and 13B illustrate, in plan view, another embodiment of the first and second subassemblies. On the first substrate is formed a rear magnetic piece 200, in addition to the first pole pieces $62_1$, $62_2$. Formation takes place on the second substrate of a rear, magnetic piece 202 and second magnetic connectors $206_1$, $206_2$, in addition to the second pole pieces $72_1$, $72_2$ and the magnetic connectors $204_1$, $204_2$.

Figure 14:
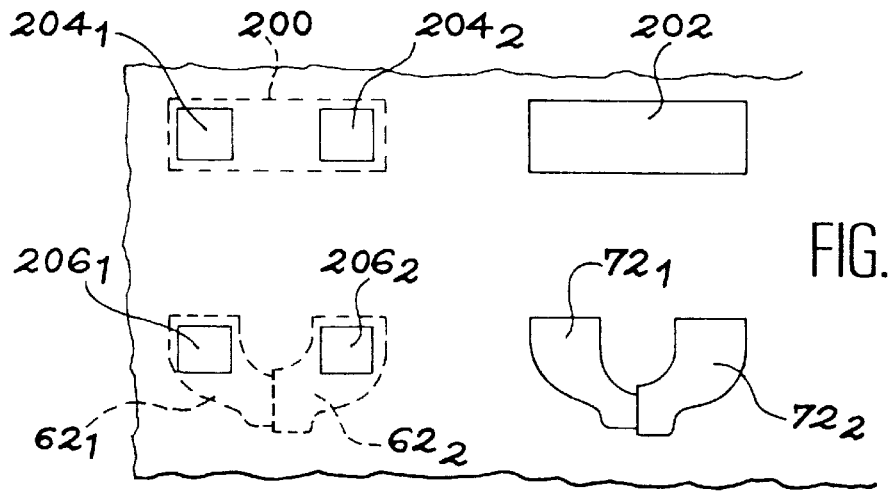
FIG. 14 shows the corresponding assembly.

After reversing the second substrate and engaging it on the first substrate (or vice versa), an assembly as illustrated in FIG. 14 is obtained. The first connectors $204_1$, $204_2$ continue to bear on the first pole pieces $62_1$, $62_2$, whilst the second connectors $206_1$, $206_2$ bear on the rear magnetic piece 200 of the first substrate.

It is then necessary to close the first magnetic circuit by two legs connecting the connectors $204_1$ and $206_1$ and the connectors $204_2$ and $206_2$. In order to close the second magnetic circuit, two magnetic legs are formed between the pole pieces $72_1$, $72_2$ and the ends of the rear piece 202. The coils can be formed at the same time, as described in connection with FIGS. 10A, 10B and 10C.

Following this description of a number of embodiments, it is clear that the first magnetic circuit for the first magnetic head is only completed following the reversal of the second substrate and the engagement thereof on the first substrate, by means of magnetic connectors bringing the magnetic elements of the first subassembly (namely the first pole pieces and, if applicable, the rear closing piece) to the upper surface of the second substrate once it has been thinned out. With regards to the second magnetic circuit for the second magnetic head, it can be completed by directly bearing on the second pole pieces, without it being necessary to provide connectors, because said pole pieces are level with the surface of the second substrate once it has been thinned out.

Figure 15:
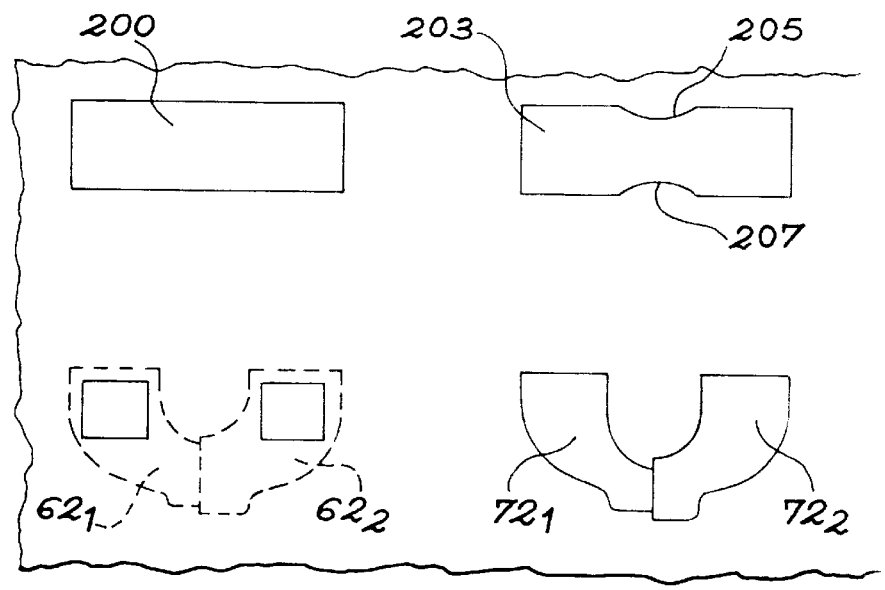
FIG. 15 illustrates an embodiment in which one of the rear magnetic pieces has a central necking.

The presence of connectors in the first magnetic circuit and the absence of such connectors in the second could lead to certain asymmetries in the heads. In order to compensate these effects, the rear closing piece of the magnetic flux of the second head can differ slightly from that of the first. Thus, FIG. 15 shows that the first piece 203 has two neckings 205 and 207 balancing the second magnetic circuit with respect to the first, which contains the second connectors $104_1$, $104_2$ and a right-hand, rear piece 200.

Figure 16:
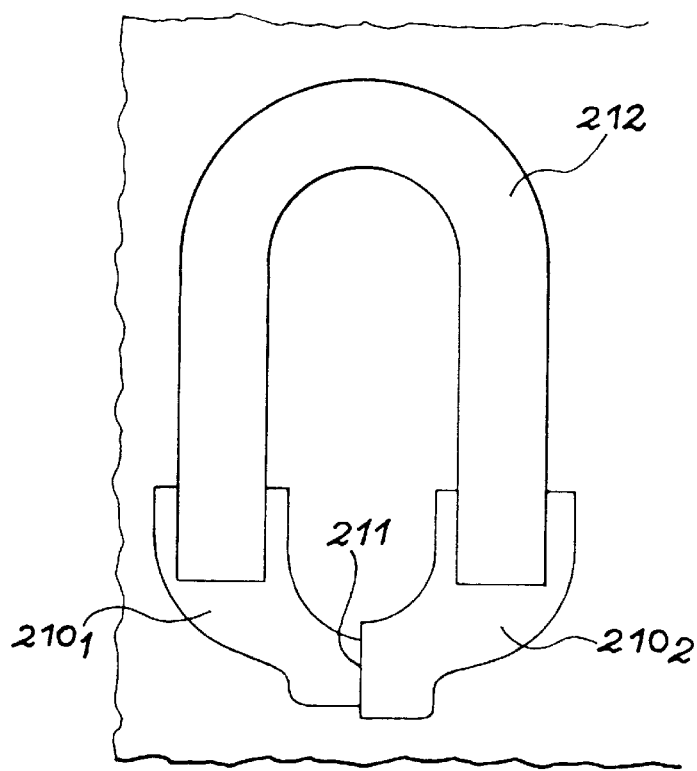
FIG. 16 shows a particular embodiment of the closing of the magnetic circuit with the aid of a single, horseshoe-shaped magnetic piece.

Naturally, the invention described hereinbefore is not limited to the case where the magnetic circuits are closed by parallelepipedic legs and rear pieces. Any magnetic piece can be used, which makes it possible to connect one of the connectors to the other or one of the pole pieces to the other. For example, FIG. 16 shows a horseshoe-shaped piece 212, directly connecting the pole piece $210_1$ to the pole piece $210_2$. This piece 212 is preferably made from an isotropic magnetic material.

Figure 3:
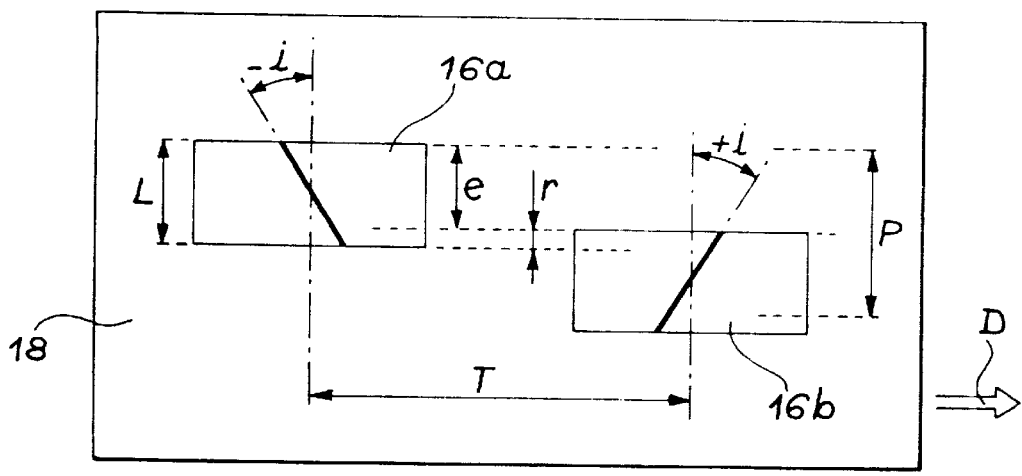
FIG. 3, already described, shows an assembly with two offset heads.
Figure 4:
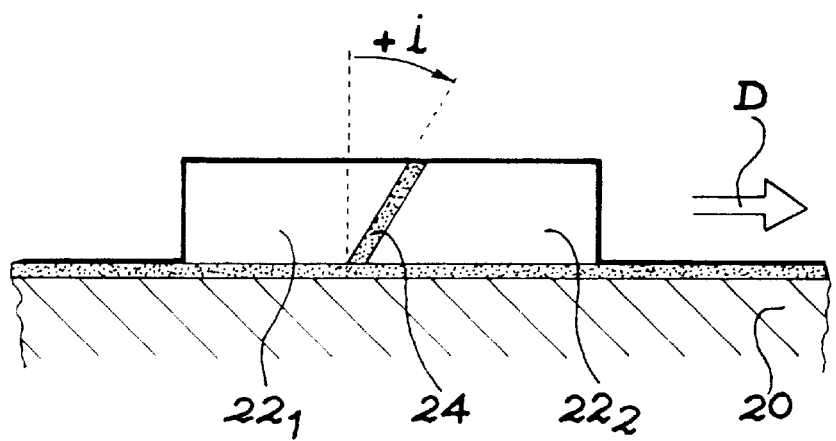
FIG. 4, already described, shows a detail of a known azimuthed gap head.
Figure 6:
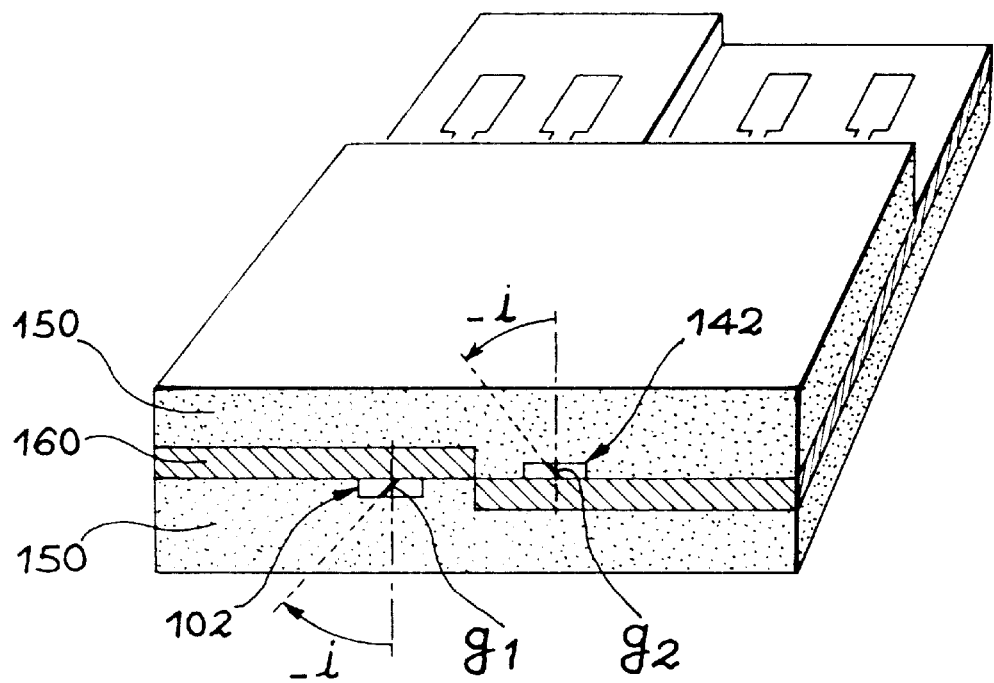
FIG. 6, already described, shows a known, double head assembly.
Figure 5:
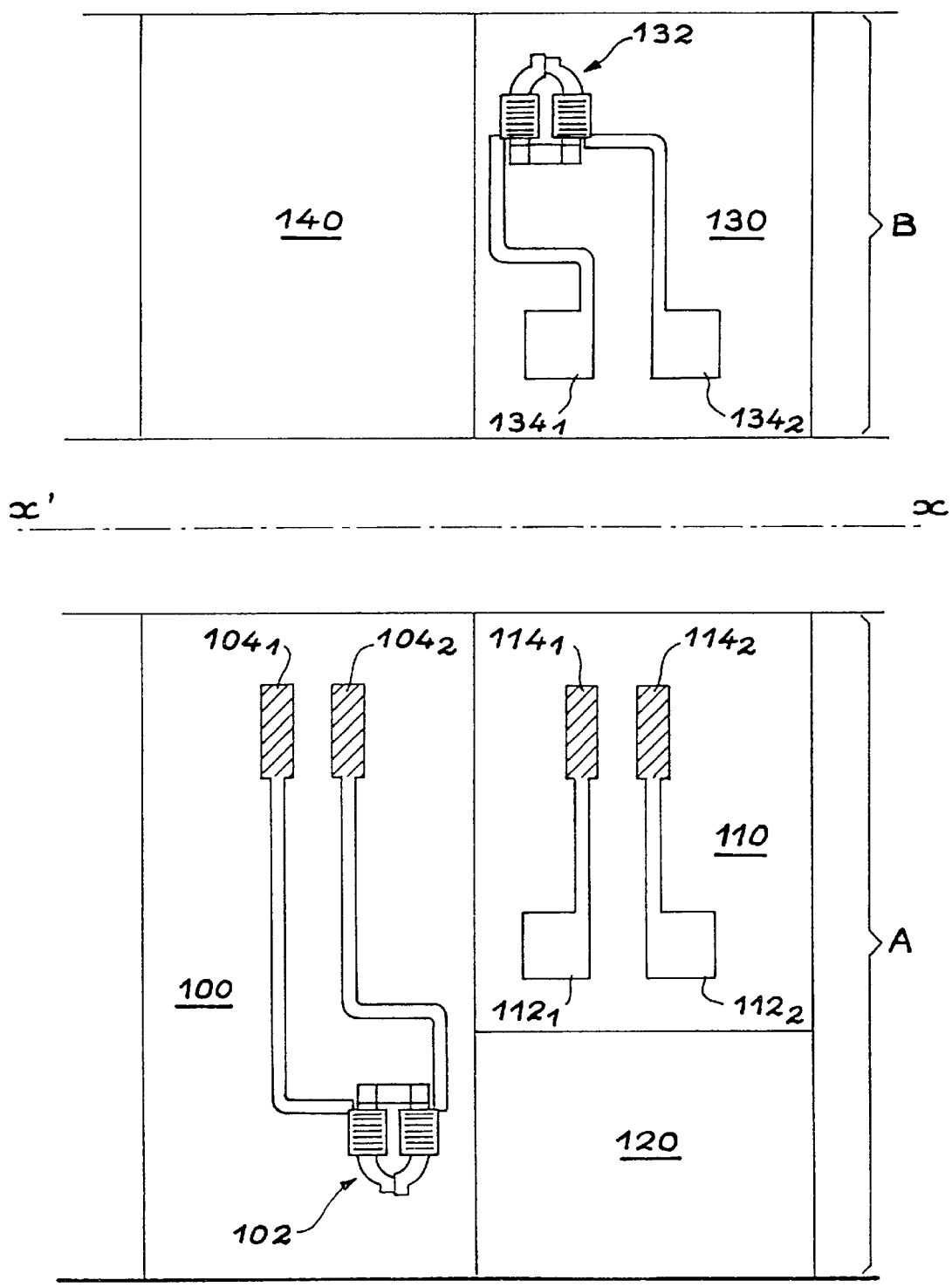
FIG. 5, already described, is a plan view of the heads, connections, contact pieces and etchings of a header and a counterheader according to a known process.
Figure 17:
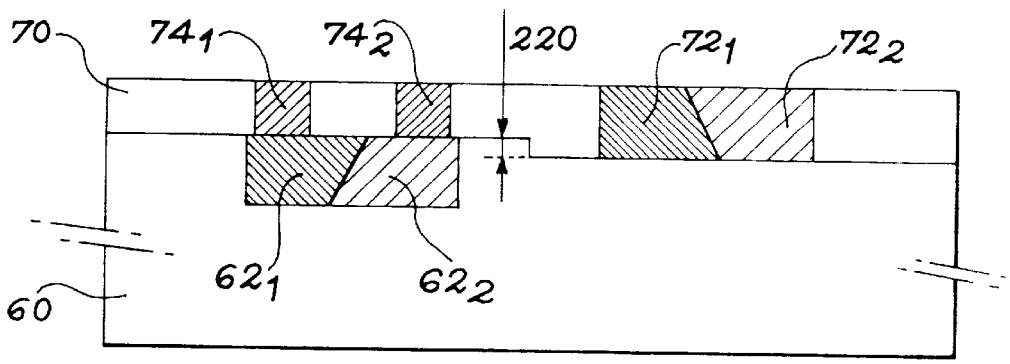
FIG. 17 illustrates a variant in which the two substrates are slightly fitted in one another so as to create an overlap of the magnetic heads.

In the embodiments described hereinbefore, the two substrates have planar surfaces and the two magnetic heads obtained, once one of the substrates has been engaged on the other, are mutually displaced without there being any overlap between them (overlap designated r in FIG. 3). However, such an overlap can easily be obtained by etching a step in each substrate, as illustrated in FIG. 17. The kink obtained carries the reference 220.

The idea could be given that by etching such a step, the problems of the prior art would arise, but this is not the case. Thus, in the process described in the aforementioned FR-A-2 747 226, the etched step in the substrates had a height exceeding 10 $\mu$m, whereas here it is merely a question of creating a slight displacement between the planes of the substrates, said displacement not exceeding approximately 2 $\mu$m. As a result of its very limited depth, said etching can be precisely controlled (tolerance of a few tenths of a micron).

Figure 18:
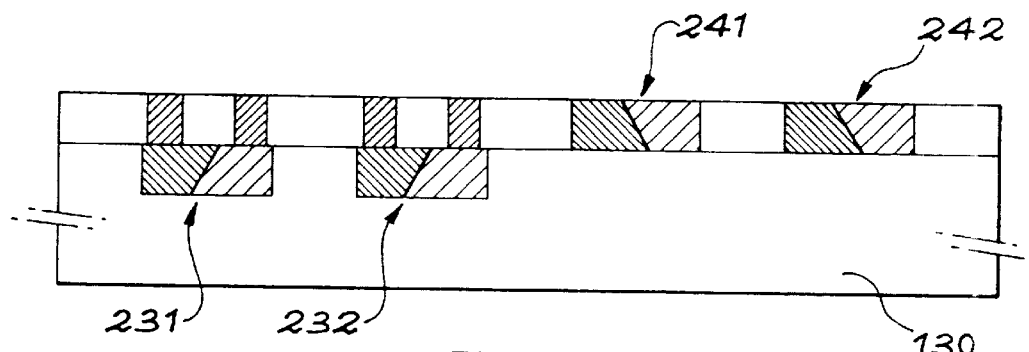
FIG. 18 shows, in section, an assembly with four magnetic heads and two opposing azimuths.

The invention is not limited to double head assemblies and instead extends to any assembly comprising a random number of heads. For example, FIG. 18 shows a quadruple head assembly. The assembly 230 comprises two identical heads 231, 232, with their pole pieces having an azimuthed gap and their magnetic connectors and two heads 241, 242 with their pole pieces with an opposite azimuth to that of the heads 241, 242.

Figure 19:
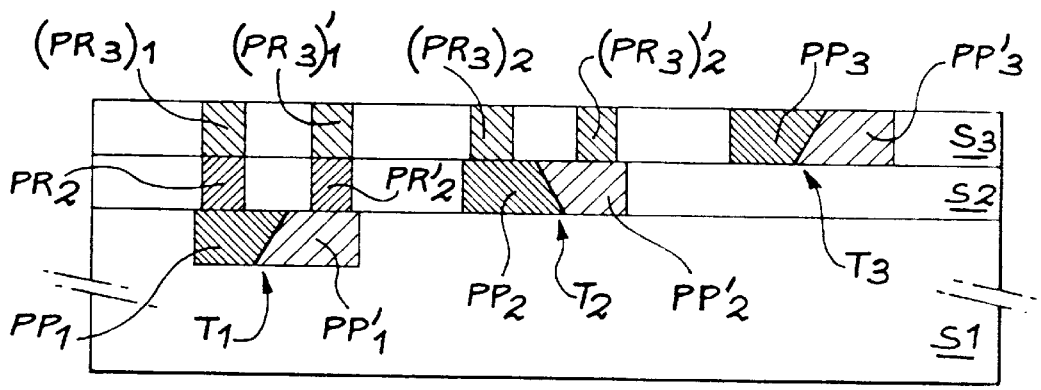
FIG. 19 illustrates a generalization of the process in the case of three substrates and three subassemblies, for obtaining an assembly having three magnetic heads.

The process according to the invention is also not limited to the implementation of two substrates, but can instead have three, as illustrated in FIG. 19.

For this purpose on a first substrate S1 is formed at least one first subassembly of magnetic elements comprising at least two first pole pieces PP1, PP2 separated by a first gap.

On a second substrate S2 is formed at least one second subassembly of magnetic elements comprising at least two second pole pieces PP2, PP2' separated by a second gap, and at least two first magnetic connectors PR2, PR2' made from a magnetic material and placed alongside said two second pole pieces PP2, PP2'.

On a third substrate S3 is formed at least one third subassembly of magnetic elements comprising at least two third pole pieces PP3, PP3' separated by a third gap, first magnetic connectors (PR3)1, (PR3)1' placed alongside the third pole pieces PP3, PP3' and two second magnetic connectors (PR3)2, (PR3)2' placed between the first magnetic connectors (PR3)1, (PR3)1' and the third pole pieces PP3, PP3'.

The second substrate S2 is engaged on the first substrate S1 in such a way that the two magnetic connectors PR2, PR2' of the second substrate S2 come into magnetic contact with the two first pole pieces PP1, PP1' of the first substrate S1.

The second substrate S2 is thinned out until said second pole pieces PP2, PP2' and said first magnetic connectors PR2, PR2' appear or almost appear.

The third substrate S3 is engaged on the second, thinned out substrate S2 in such a way that the two first magnetic connectors (PR3)1, (PR3)1' of the third substrate S3 come into magnetic contact with the two magnetic connectors PR2, PR2' of the second substrate S2 and the two second magnetic connectors (PR3)2, (PR3)2' come into magnetic contact with the second pole pieces PP2, PP2' of the second substrate S2.

The third substrate S3 is thinned out until the third pole pieces PP3, PP3', the two first connectors (PR3)1, (PR3)1' and the second connectors (PR3)2, (PR3)2' appear or almost appear.

On the thus thinned out, third substrate is formed a first magnetic closing circuit connecting one of the first magnetic connectors (PR3)1 to the other (PR3)1' and a first reading and/or writing means, such as e.g. a first conductor coil magnetically coupled to said first magnetic circuit, a second magnetic circuit is formed connecting one of the second magnetic connectors (PR3)2 to the other (PR3)2' and a second reading and/or writing means, such as e.g. a second conductor coil magnetically coupled to the second magnetic circuit and a third magnetic circuit is formed connecting one of the third pole pieces (PP3) to the other (PP3') and a third reading and/or writing means, such as e.g. a third conductor coil magnetically coupled to said third circuit.

The term "magnetic contact" is understood to mean an either direct, or indirect contact, but which is sufficient for ensuring the magnetic continuity.

This process can be generalized to n substrates:

On a first substrate is formed at least one first subassembly of magnetic elements comprising at least two first pole pieces separated by a first gap.

On a second substrate is formed at least one second subassembly of magnetic elements comprising at least two second pole pieces separated by a second gap, and at least two first magnetic connectors made from a magnetic material and placed alongside two of said second pole pieces.

This is continued over (n−1) substrates, with n being an integer higher than 3.

On a nth substrate is formed at least one nth subassembly of magnetic elements comprising at least two nth pole pieces separated by an nth gap, two first magnetic connectors and two second magnetic connectors, two (n−1)th magnetic connectors.

The second substrate is engaged on the first in such a way that the two connectors of the second substrate come into magnetic contact with the two first pole pieces of the first substrate.

The second substrate is thinned out until the said second pole pieces and the said first magnetic connectors appear or almost appear.

This is continued up to the nth substrate, which is engaged on the (n−1)th thinned out substrate, in such a way that the second magnetic connectors of the nth substrate come into magnetic contact with the two first connectors of the (n−1)th substrate, the two second magnetic connectors of the nth substrate making magnetic contact with the two second connectors of the (n−1)th substrate, etc., the two (n−1)th connectors of the nth substrate making magnetic contact with the two pole pieces of the (n−1)th substrate.

The nth substrate is thinned out until said nth pole pieces and said first, second and (n−1)th magnetic connectors appear or almost appear.

On the nth substrate is formed a first magnetic circuit connecting one of the first magnetic connectors to the other and a first reading and/or writing means, such as e.g. a first conductor coil magnetically coupled to said first magnetic circuit, a second magnetic circuit connecting one of the second magnetic connectors to the other and a second reading and/or writing means, such as e.g. a second conductor coil magnetically coupled to said magnetic circuit is formed and so on and a nth magnetic circuit is formed connecting one of the nth pole pieces to the other, and a nth reading and/or writing means is formed, such as e.g. a nth conductor coil magnetically coupled to said nth magnetic circuit.

The assembly obtained then comprises n magnetic heads with their n magnetic circuits and their n reading and/or writing means, e.g. n conductor coils.

What is claimed is:

1. A process for the production of an assembly having several magnetic heads, comprising the steps of:
    forming on a first substrate at least one first subassembly by forming at least two first pole pieces, separated by a first gap,
    forming on a second substrate at least one second subassembly, by forming at least two second pole pieces separated by a second gap and by forming at least two magnetic connectors made from a magnetic material, said magnetic connectors being placed alongside two of said second pole pieces,
    reversing and engaging one of the substrates on the other in such a way that said two magnetic connectors of said second substrate come or almost come into contact with said two first pole pieces of said first substrate so as to ensure a magnetic continuity,
    thinning out said second substrate until said second pole pieces and said magnetic connectors appear or almost appear,
    forming on said thinned out second substrate a first magnetic circuit connecting said two magnetic connectors and a first reading and/or writing means magnetically coupled to said first circuit, and
    forming a second magnetic circuit connecting said two second pole pieces and a second reading and/or writing means magnetically coupled to said second magnetic circuit.

2. A process according to claim 1, wherein the step of forming said first reading and/or writing means comprises forming a first conductor coil and the step of forming said second reading and/or writing means comprises forming a second conductor coil.

3. A process according to claim 2, wherein, the step of forming said first and second magnetic circuits, and the step of forming said first and second conductor coils, comprise the steps of:
    forming on or in the second thinned out substrate at least one first lower conductor layer to the rear of the connectors and at least one second lower conductor layer to the rear of the second pole pieces,
    forming on the second substrate a first magnetic closing circuit connecting one of the magnetic connectors to the other part of said first magnetic circuit overlapping the first lower conductor layer and second magnetic closing circuit connecting one of said second pole pieces to the other, a part of said second magnetic circuit overlapping the second lower conductor layer,
    forming at least one first upper conductor layer above the first lower conductor layer and at least one second upper conductor layer above the second lower conductor layer, the first respectively lower and upper layers being electrically interconnected and forming a first coil and the second, respectively lower and upper layers being electrically interconnected and forming a second coil.

4. A process according to claim 3, further comprising the steps of:
    forming on the second substrate a first rear magnetic piece positioned to the rear of the first connectors,
    forming on the second substrate a second rear magnetic piece positioned to the rear of the second pole pieces,
    wherein the step of forming the first magnetic closing circuit comprises forming two first magnetic legs connecting the first rear magnetic piece to the two connectors,
    wherein the step of forming the second magnetic closing circuit comprises forming two second magnetic legs connecting the second magnetic piece to the two second pole pieces.

5. A process according to claim 4, comprising the steps of:
    forming a first lower conductor layer with two first identical underlayers, the first two magnetic legs respectively passing above said two first underlayers,
    forming a second lower conductor layer with two second identical underlayers, the two second magnetic legs respectively passing above said two second underlayers,
    forming a first upper conductor layer with two first identical overlayers positioned above the first underlayers and a second upper conductor layer with two second identical overlayers placed above the second underlayers.

6. A process according to claim 5, further comprising, after forming the first and second lower conductor layers:
    forming electrical connectors on the conductors, and
    forming thereafter the first and second magnetic legs.

7. A process according to claim 5, further comprising, after forming the first and second magnetic legs:
    forming electrical connectors on the conductors of the lower layer.

8. A process according to claim 3, comprising the steps of:
    forming a first lower conductor layer with two first identical underlayers,
    forming a second lower conductor layer with two second identical underlayers,
    forming a first upper conductor layer with two first, identical overlayers positioned above the first underlayers and a second upper conductor layer with two second identical overlayers placed above the second underlayers.

9. A process according to claim 8, further comprising, after forming the first and second lower conductor layers:

forming electrical connectors on the conductors.

10. A process according to claim 8, further comprising:
forming electrical connectors on the conductors of the lower layer.

11. A process according to claim 2, wherein the step of forming said first magnetic circuit on or in the second substrate comprises depositing a horseshoe-shaped magnetic piece connecting one of the first elements to the other.

12. A process according to claim 2, wherein, the step of forming said second magnetic circuit on or in the second substrate comprises depositing a horseshoe-shaped magnetic piece connecting one of the second pole pieces, to the other.

13. A process according to claim 2, comprising the steps of:
forming on the first substrate at least one first subassembly comprising, in addition to said first pole pieces, a first rear magnetic piece positioned to the rear of the first pole pieces,
forming on the second substrate at least one second subassembly comprising, in addition to said second pole pieces, said two first magnetic connectors, a second rear magnetic piece to the rear of the second pole pieces and two second magnetic connectors made from a magnetic material, positioning said two second connectors to the rear of the two first connectors and coming or almost coming into contact with said first rear magnetic piece of the first substrate when the two substrates are engaged on one another,
wherein the step of forming the first magnetic closing circuit comprises forming two first magnetic legs connecting the two first connectors to the two second connectors,
wherein the step of forming the second magnetic closing circuit comprises forming two second magnetic legs connecting the second rear magnetic piece to the two second pole pieces.

14. A process according to claim 1, further comprising forming a single first subassembly on the first substrate.

15. A process according to claim 1, further comprising forming two first subassemblies on the first substrate.

16. A process according to claim 1, further comprising forming a single second subassembly on the second substrate.

17. A process according to claim 1, further comprising forming two second subassemblies on the second substrate.

18. A process according to claim 1, further comprising forming a single first subassembly on the first substrate and forming a single second subassembly on the second substrate of a single second subassembly, thereby forming a double-head assembly.

19. A process according to claim 18, further comprising defining by the first two pole pieces of the first substrate a first gap (63) having a first azimuth and defining by the second pole pieces of the second substrate a second gap with a second azimuth.

20. A process according to claim 19, further comprising forming said first azimuth opposed to said second azimuth.

21. A process according to claim 1, further comprising forming two first subassemblies on said first substrate and forming two subassemblies on said second substrate.

22. A process according to claim 21, further comprising forming two first subassemblies having two first gaps with a same first azimuth and forming two second subassemblies having two second gaps with a same second azimuth.

23. A process according to claim 22, further comprising forming said first azimuth common to said two first subassemblies opposite to said second azimuth common to said two second subassemblies.

24. A process according to claim 1 further comprising etching a first step in said first substrate alongside said first magnetic heads and etching a second identical step to the first step in the second substrate level with the two magnetic connectors and fitting a portion of the second substrate containing the two second pole pieces into the first step, and fitting a portion of the first substrate containing the first pole pieces into the second step.

25. A process for producing a multiple magnetic head assembly, comprising the steps of:
forming on a first substrate at least one first subassembly of magnetic elements comprising at least two first pole pieces separated by a first gap,
forming on a second substrate at least one second subassembly of magnetic elements comprising at least two second pole pieces separated by a second gap, and forming at least two first magnetic connectors made from a magnetic material and placed alongside the two second pole pieces,
forming on a third substrate at least one third subassembly of magnetic elements comprising at least two third pole pieces separated by a third gap, by placing first magnetic connectors alongside said third pole pieces and placing two second magnetic connectors between said first magnetic connectors and the third pole pieces,
engaging the second substrate on the first substrate in such a way that the two magnetic connectors of the second substrate come into contact or almost into contact with the two first pole pieces of the first substrate, so as to ensure a magnetic continuity,
thinning out the second substrate until said second pole pieces and said first magnetic connectors appear or almost appear, engaging the third substrate on the second thinned out substrate so that the two first magnetic connectors of the third substrate come into contact or almost into contact with the two magnetic connectors of the second substrate and so that the two second magnetic connectors come into contact or almost into contact with the second pole pieces of the second substrate,
thinning out the third substrate until the third pole pieces, the two first connectors and the two second connectors appear or almost appear,
forming on the thinned out third substrate a first magnetic closing circuit connecting one of the first magnetic connectors to the other with a first reading and/or writing means magnetically coupled to said first circuit, forming a second magnetic circuit connecting one of the second magnetic connectors with a second reading and/or writing means magnetically coupled to the second magnetic circuit, forming a third magnetic circuit connecting one of the third pole pieces to the other and a third reading and/or writing means magnetically coupled to said third circuit.

26. A process for producing an assembly having multiple magnetic heads, comprising the steps of:
forming on a first substrate at least one first subassembly of magnetic elements comprising at least two first pole pieces separated by a first gap,
forming on a second substrate at least one second subassembly of magnetic elements comprising at least two second pole pieces separated by a second gap, and at least two first magnetic connectors made from a magnetic material and placed alongside two of said second pole pieces,
forming on an (n—1)th substrate, with n being an integer exceeding 3, at least one (n—1)th subassembly of magnetic elements comprising at least two (n—1)th pole pieces separated by an (n—1)th gap, forming on a nth substrate at least one nth subassembly of magnetic elements comprising at least two nth pole pieces separated by a nth gap, two first magnetic connectors, two second magnetic connectors, . . . , two (n—1)th magnetic connectors, engaging the second substrate on the first, in such a way that the two connectors of the second substrate come into contact or almost into contact with the two first pole pieces of the first substrate, thinning out the second substrate until said second pole pieces and said first magnetic connectors appear or almost appear, repeating the preceding two steps up to the nth substrate, engaging said nth substrate on the (n—1)th thinned out substrate, in such a way that the two first magnetic connectors of the nth substrate come into contact or almost into contact with the two first connectors of the (n—1)th substrate, so that the two second magnetic connectors of the nth substrate come into contact or almost into contact with the two second connectors of the (n—1)th substrate, so that the two (n—1)th connectors of the nth substrate come into contact or almost into contact with the two pole pieces of the (n—1)th substrate, thinning out the nth substrate until said nth pole pieces and said first, second, . . . (n—1)th magnetic connectors appear or almost appear, forming on the nth substrate a first magnetic circuit connecting one of the first magnetic connectors to the other and a first reading and/or writing means coupled to said first magnetic circuit, and forming a second magnetic circuit connecting one of the second magnetic connectors to the other and a second reading and/or writing means magnetically coupled to said second magnetic circuit and so on, forming a nth magnetic circuit connecting the nth pole pieces to the other and a nth reading and/or writing means magnetically coupled to said nth magnetic circuit.

* * * * *